Figure 1:
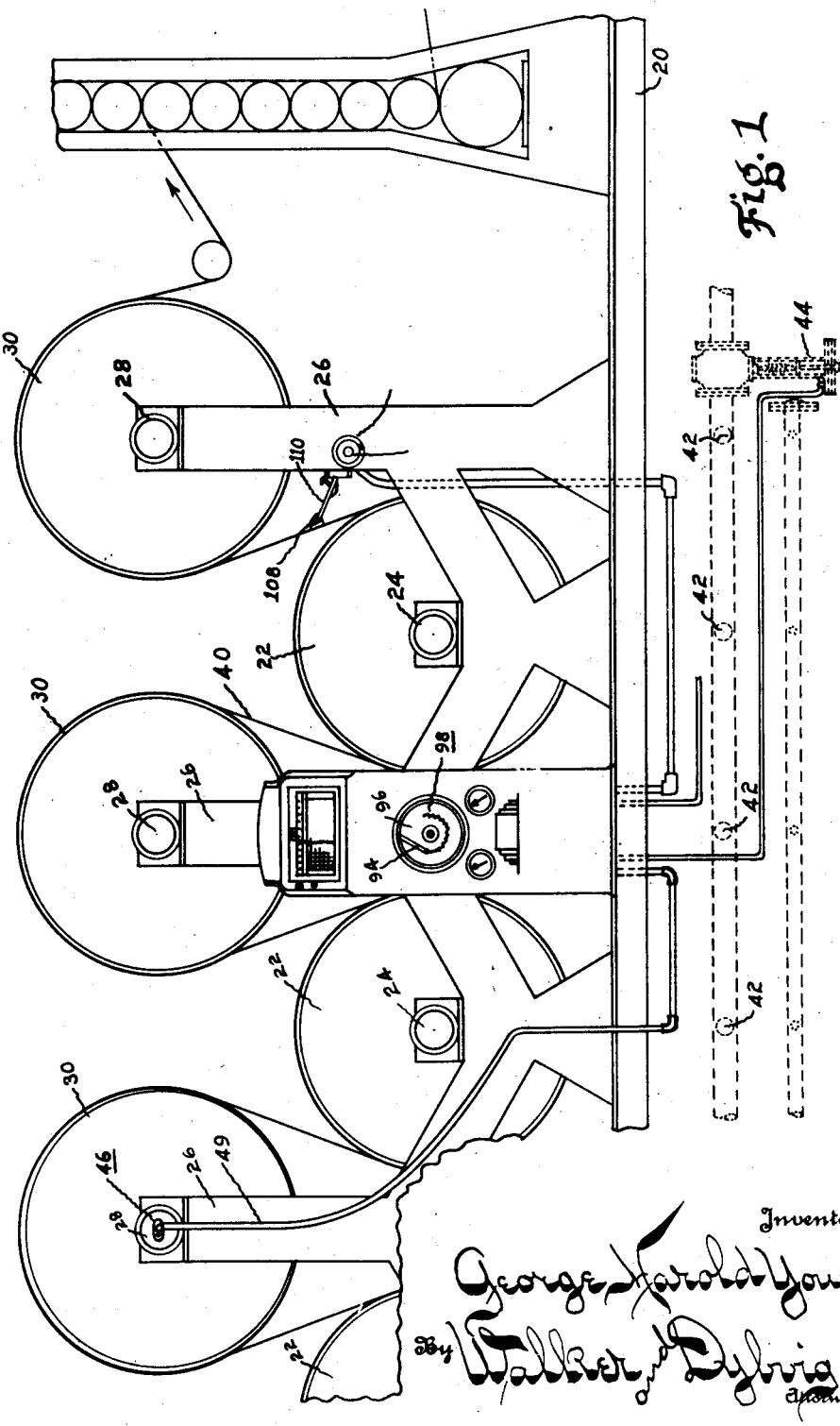

April 23, 1940.　　　　G. H. YOUNG　　　　2,197,823
MOISTURE METER AND CONTROLLER
Filed April 22, 1935　　　　4 Sheets-Sheet 1

April 23, 1940.  G. H. YOUNG  2,197,823
MOISTURE METER AND CONTROLLER
Filed April 22, 1935  4 Sheets-Sheet 3
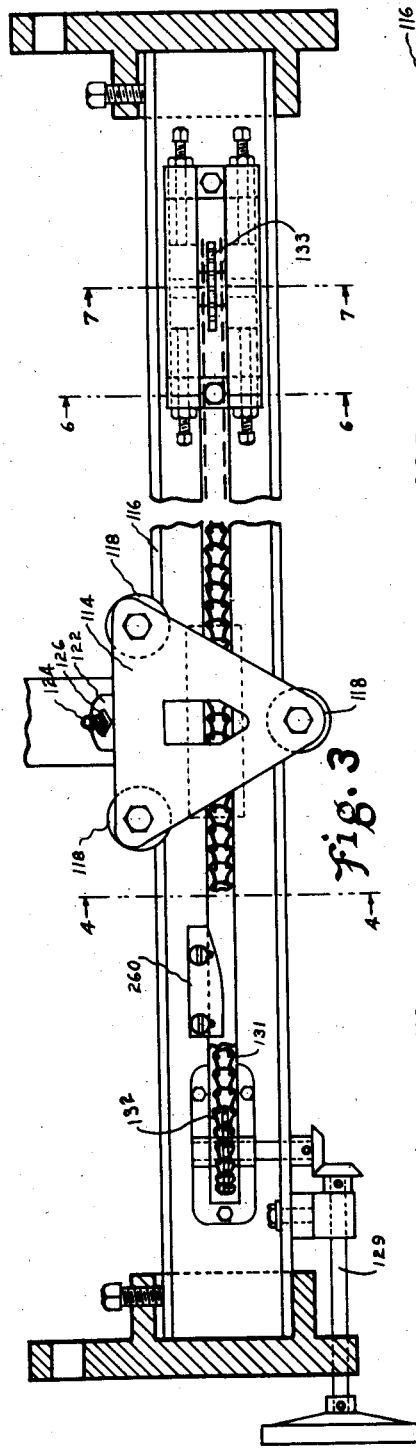
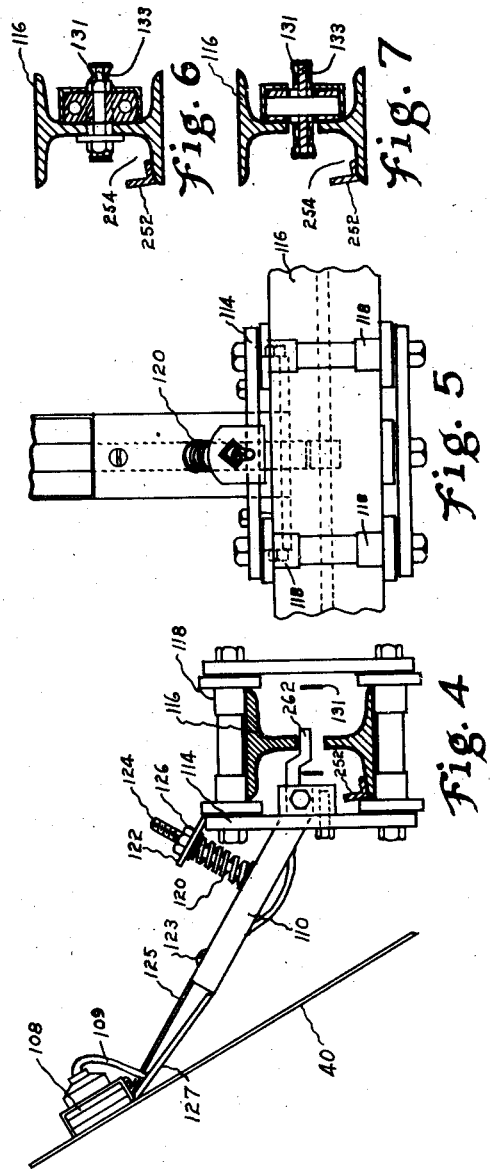
Inventor
George Harold Young
By Walker & Dybvig
Attorneys April 23, 1940.   G. H. YOUNG   2,197,823
MOISTURE METER AND CONTROLLER
Filed April 22, 1935   4 Sheets-Sheet 4
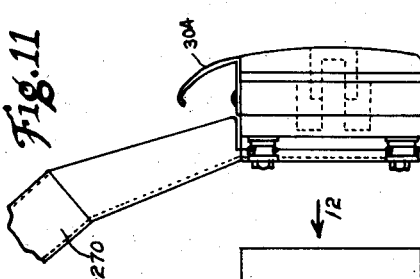
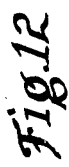
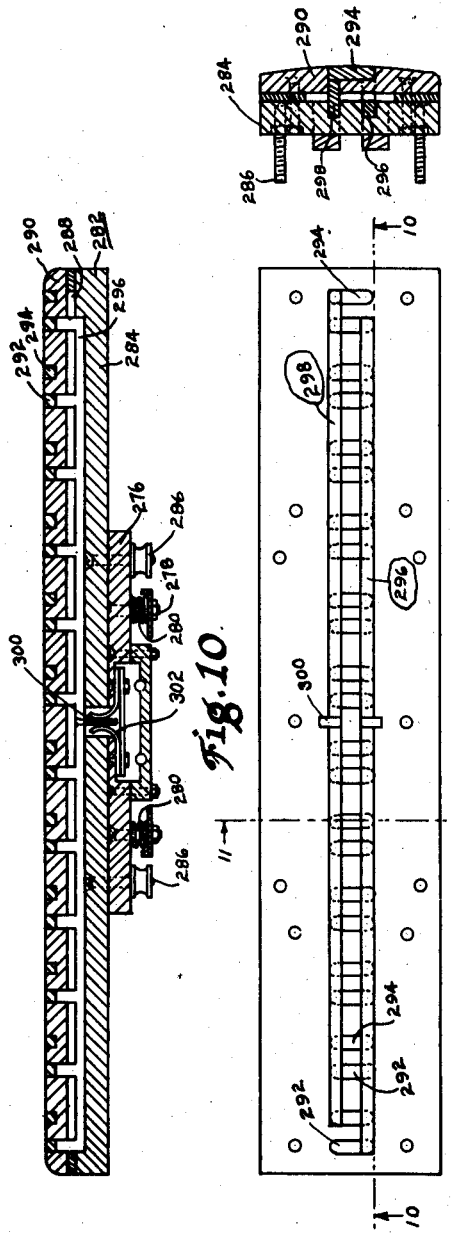
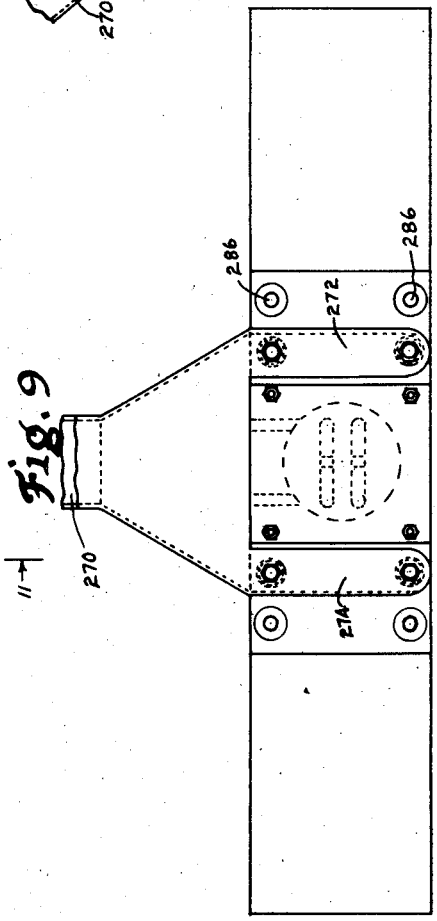
Inventor
George Harold Young
By Walker and Dybvig
Attorneys Patented Apr. 23, 1940

2,197,823

UNITED STATES PATENT OFFICE 2,197,823

MOISTURE METER AND CONTROLLER

George Harold Young, Dayton, Ohio

Application April 22, 1935, Serial No. 17,751

24 Claims. (Cl. 34—48)

This invention relates to a compensating meter apparatus, responsive to varying conditions for automatically varying one of two counterconditions by fluctuations of a second related condition, which for illustrative purposes is shown embodied in an automatic moisture-temperature regulator for varying the temperature of the drier rolls of a paper making machine in accordance with fluctuations of the moisture content of a paper web passing over the rolls to effect and maintain uniform production, by detecting and measuring the amount of moisture in the paper and thereby automatically varying the admission of steam to the drier rolls for heating purpose. While illustrated in connection with a paper making apparatus, it is to be understood that the invention is not so limited but may be applied to various other industries, such as starch making and drying apparatus, wood drying kilns, wall paper and textile printing. It may also be applied to regulating the supply of water when mixing concrete in accordance with the moisture content of the sand employed, and for sugar refining, and other analogous purposes.

The object of the invention is to provide an apparatus simple in construction as well as in its means and mode of operation which will be extremely sensitive in detecting a changing controlled condition and which, responsive thereto, will promptly and effectively translate such change into a neutralizing change of the controlling condition.

Another object of this invention is to provide a controlling mechanism responsive to changes in quality of the material coming in contact with the control mechanism.

Another object of this invention is to provide a control mechanism that is responsive to any pre-determined portion of the material to be controlled.

Another object of this invention is to provide a device responsive to the moisture content of a work sheet.

Another object of this invention is to change the magnitude of the signals received from the indicating mechanism to be adaptable to the mechanism to be controlled.

Another object of this invention is to provide a plurality of controls for a paper manufacturing machine.

Another object of this invention is to provide an automatic dual control mechanism for a paper manufacturing machine responsive to conditions within the machine and conditions of the work material.

Another object of this invention is to provide a control mechanism responsive to the temperature variations of the dryer and responsive to the material dried.

Another object of this invention is to provide a control mechanism for changing conditions in response to changed conditions, said control mechanism having controls for limiting the effectiveness thereof.

Figure 2:
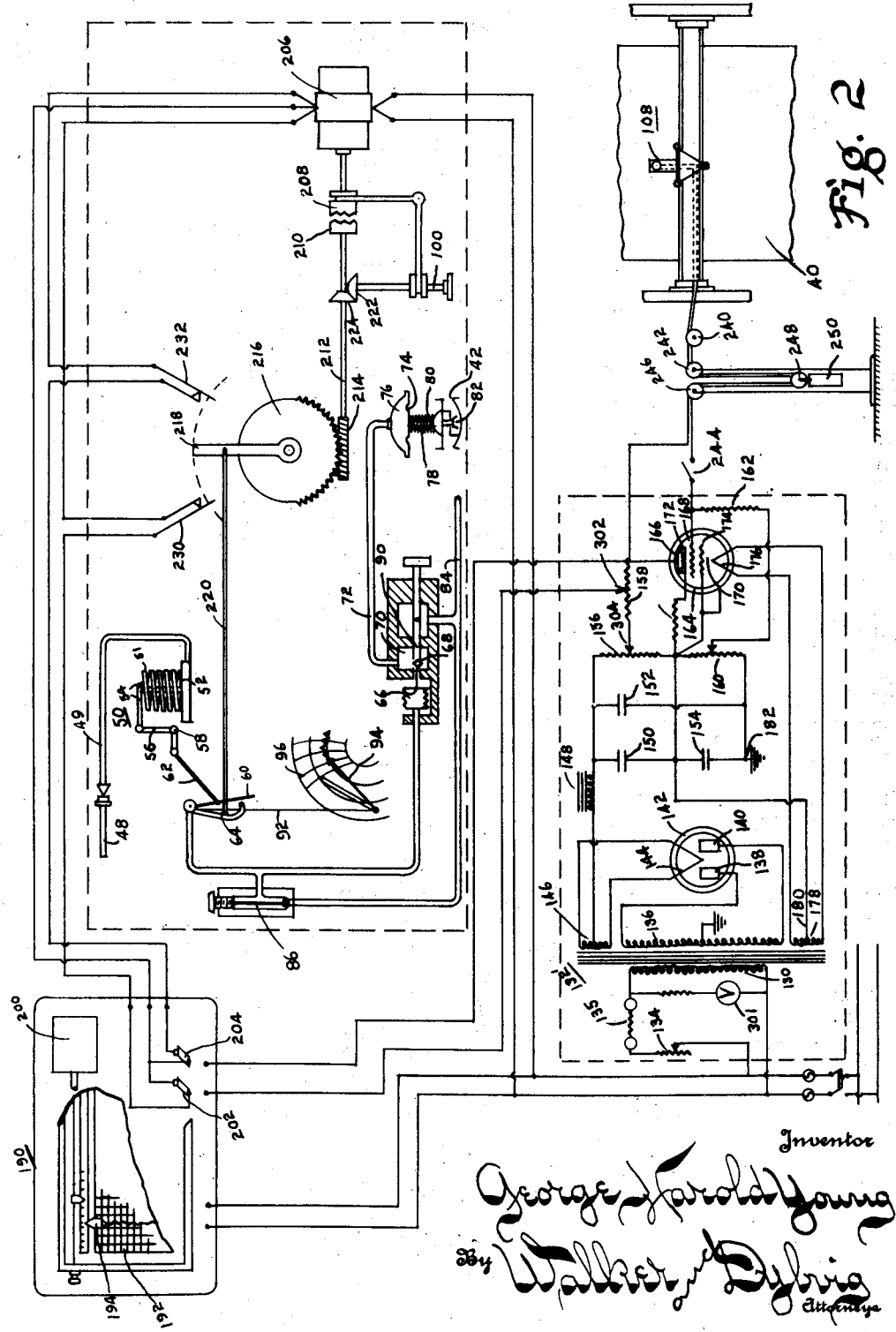

In the drawings, Fig. 1 is a schematic side view of a paper dryer. Fig. 2 is a schematic diagram of the control device for the paper dryer. Fig. 3 is a side elevation of the carriage for the indicator mechanism. Figs. 4, 6 and 7 are sectional views taken on line 4—4, 6—6 and 7—7 respectively of Fig. 3. Fig. 5 is a fragmentary plan view of the carriage. Figs. 8 to 12 are detailed views of a modified contactor; Fig. 11 taken on the lines 11—11 of Fig. 9 and Fig. 12, a view looking in the direction of the arrow 12 in Fig. 8. Fig. 10 is a sectional view taken along the line 10—10 of Fig. 9.

In manufacturing processes and machines it is oftentimes desirable to compensate for varying conditions so as to have a uniform output. For example, in the manufacture of paper it is desirable to maintain the moisture content thereof within predetermined limits. In other processes it may be desirable to control the ingredients so as to produce a uniform output, as for example, in the manufacture of concrete. The amount of water applied to the aggregate is dependent upon the moisture content of the sand and gravel used. In connection with the making of concrete, the quantity of water is controlled in response to the moisture content of the sand used.

In the manufacture of paper and other materials, the moisture content of the output of the machine may be varied by changing the temperature of the drying rolls, by changing the rate of speed of the drying rolls, by changing the moisture content of the pulp passing over the press rolls, etc. In the embodiment disclosed, the moisture content of the paper as it leaves the machine is controlled by varying the temperature of the drying rolls which is accomplished by regulating steam supplied thereto.

As herein shown, a series of pairs of electrodes mounted in proximity to the finished sheet causes a current bearing a definite relation to the moisture content of the sheet to flow through a circuit which actuates an indicating mechanism in response to the current magnitude or the voltage magnitude as the case may be, to indicate on a chart the moisture content of the paper. The current in the circuit also actuates control mechanism for controlling the steam supplied to the drying rolls. In addition to this control mechanism, another control mechanism responsive to the temperature of the rolls maintains the steam pressure constant for any given moisture content of the paper. Thus it may be seen that two controls are provided, one of which is responsive to the moisture content of the paper and the other responsive to the steam pressure supplied to the drying rolls. The two controls cooperate to compensate for changes in one another so that the control of one does not defeat the control of the other.

Referring in more particular to the drawings wherein the device has been embodied in a paper making machine, there is disclosed a mechanism responsive to the temperature of the drying rolls for controlling the pressure of the steam admitted thereto. A meter mechanism for indicating the temperature of the steam supplied, a steam controlling mechanism responsive to the temperature of the drying rolls for maintaining a consistent steam pressure for predetermined conditions, a moisture content indicator for indicating the moisture content of the material passing over the drying rolls and an amplifying unit for amplifying the currents flowing through the indicating device, a motor driven control mechanism responsive to the moisture content of the work material for controlling the temperature of the drying rolls so as to maintain a uniform moisture content of the output material, and a safety device for stopping the movement of the motor at the end of predetermined cycles. Each of these will now be described in detail.

In the drawings, reference character 20 indicates the base of a paper making machine that carries a plurality of rollers 22, journaled in bearings 24, and a plurality of standards 26 terminating in bearings 28 in which the rollers 30 are journaled, all of which cooperate to feed a strip of paper 40 over the drying rolls 22 and 30, as is well known to those skilled in the art. The drying rolls 22 and 30 are heated by steam supplied thereto by suitable conduits 42 connected to a suitable steam supply.

In order to maintain the drying rolls at a constant temperature for a given setting of the control apparatus, which will appear more fully later, the pressure of the steam supplied to the drying rolls is controlled by a control valve mechanism 44 operating in response to the temperature of the drying rolls as determined by a thermal bulb 46 located in one of the rolls. The thermal bulb includes a long tubular member 48, a conduit 49 and a pressure operated motor 50 in which there is sealed a suitable fluid, either a gas or a liquid. When the steam pressure changes in the drying rolls the temperature surrounding the tubular member 48 changes, which causes the fluid therein to either expand or contract thereby changing the pressure supplied to the motor 50. The motor 50 includes a tubular member arranged in the form of a helix 51, one end of which is fixedly carried at 52 and the other end connected to an armature 54 connected to a bell crank lever 56 pivoted at 58, driving a flapper 60 through a link 62. The position of the flapper 60 with respect to a jet 64 determines the air pressure supplied to a diaphragm 66, carrying a valve 68 that regulates the opening in a chamber 70 having a conduit 72 extending to the diaphragm 74 in the bellows valve 76 to actuate a plunger 78 against the force of the spring 80 to control the valve 82 in the steam conduit 42. Air is supplied to the chamber 70 from an air supply, not shown, through a pipe 84 having one branch passing into the chamber 70 and another branch into a valve 86 supplying air to the jet 64 and the diaphragm 66.

As the temperature, as indicated by the thermal bulb 46, drops, the valve 82 is moved to the down position by the pressure of the air supplied to the diaphragm 74 increasing in that the flapper 60 is moved away from the jet 64, thereby decreasing the back pressure and permitting the air to escape through the jet 64 thus decreasing the air pressure to the left of the diaphragm 66, which moves the valve 68 away from the orifice 90 in the chamber 70. When the temperature in the drying rolls increases, the thermal bulb 46 causes the flapper 60 to move towards the jet 64 thereby restricting the orifice, creating a back pressure that reduces the pressure upon the diaphragm 74 permitting the spring 78 to close the valve 82 thereby reducing the amount of steam supplied to the drying rolls.

The flapper 60 is carried on a shaft 92 that carries an indicator 94 which records the temperature of the drying rolls upon a chart 96 rotated by a suitable clock mechanism, not shown, in the meter mechanism 98 shown in Fig. 1.

The above steam pressure regulating mechanism is well known to those skilled in the art and it, per se, does not constitute part of my invention. Any suitable type of steam pressure regulator such as that known in the industry as the Foxboro temperature controllers could be used within the scope of my invention.

The device thus far described tends to maintain a constant steam pressure within the drying rolls but does not compensate for variations in the moisture content of the output material which may vary due to a number of influences aside from the temperature of the drying rolls as, for example, the moisture content of the pulp, the ingredients of the pulp, the condition of the atmosphere in or around the dryer, the thickness of the sheets of materials fed over the dryers and numerous other influences. In the past this has been taken care of by adjusting the jet 64 by a control knob 100 found in the meter which controls the position of the nozzle 64 with respect to the flapper 60. This, however, does not correct the moisture content excepting when manually operated. In the past it has been common practice for the operator of the machine to tear off a piece of paper, weighing the paper before and after drying, to determine the moisture content thereof. This is generally referred to as an oven test. In the present device the temperature of the rolls is changed in response to variations of the moisture content of the paper. This device will now be described.

A series of paired electrodes carried upon a riding contactor or detector 108, is connected by a pair of leads 109 to a source of potential which will be described more fully later. The riding contactor or detector 108 is carried upon a frame 110 pivotally mounted upon a chassis 114 movably supported on a rail 116 through rolls 118. The contactor 108 is biased against the work sheet 40 by a spring 120 mounted intermediate member 110 and a bracket 122 on a bolt 124 that is limited in its movement by lock nuts 126. The angle of the contactor 108 may be changed by loosening screw 123 threadedly engaging member 125 and seated in a longitudinal slot in member 110, and flexing or bending the arm 127.

When the contactor 108 has been adjusted to properly engage the paper, the screw 123 is tightened to hold the parts in a relatively fixed relation.

In the manufacture of paper it has been found that the moisture content throughout the width of the sheet varies in spite of the fact that the temperature of the drying rolls throughout the entire length thereof is constant. There are several causes aside from the drying rolls for variations in the moisture content of the paper. It has been found, for example, that the thickness of the paper throughout the sheet varies to a considerable extent. The thinner the sheet advancing over the drying rolls, the dryer the sheet will be for given conditions in the dryer. Thus a sheet that varies in thickness will have a varying moisture content that bears a definite ratio to the thickness.

As already described, the paper in the past has been tested by an oven test. The results thus obtained are very inaccurate for the reason that if the operator happens to tear a sheet at its thinnest portion, the measured moisture content is not the same as the moisture content of the sheet as a whole, and if the operator happens to tear off the thickest portion of the sheet, again the tested moisture content is in error.

In view of the foregoing, applicant has provided a moisture responsive control device that may be moved transversely with respect to the sheet so as to control the drying apparatus temperature in accordance with the moisture content throughout the width thereof. This has been accomplished by moving the contactor 108 across a sheet of material by manually operating a driving mechanism 129 actuating a flexible drive member 131 trained over sprockets 132 and 133. The operator actuating the driving mechanism 129 may determine the moisture content at any place across the width of the strip as will appear more fully later.

Due to the extremely high impedance offered by the paper closing the circuit from the positive to the negative electrodes, a high potential is supplied thereto which results in a very small flow of current. As the changes in flow of current between the electrodes varies but slightly within the tolerable range of moisture variation, it has been found necessary to amplify the change of current by an amplifying device which will now be described.

The primary winding 130, as best seen in Fig. 2, of a transformer 132' is energized from an A. C. source of current, the voltage of which is manually regulated by rheostat 134 and automatically controlled by a voltage regulator 135. The secondary of the transformer 132' is provided with a plurality of windings of which 136 supplies a potential to the plates 138 and 140 of a rectifier 142 having the cathode 144 energized from the secondary winding 146. The rectified current supplied by the rectifier 142 is passed through a filter unit including the choke coils 148 and condensers 150, 152 and 154 arranged in a manner well known to those skilled in the art.

One of the electrodes of the contactor 108 is connected through a variable resister 158 in series with a variable portion of resister 156 cooperating with resister 160 to form a voltage divider connected across the terminals of the rectifier output. The other electrode of the contactor 108 is connected through a fixed resistance 162 to a variable portion of resister 160. The current flowing from electrode to electrode in the contactor 108 is amplified by an amplifying unit including a thermionic vacuum tube 164 having the plate 166 connected to one electrode and the control grid 168 to the other electrode of the contactor. In the form shown a suitable exponential mu tube having an indirectly heated cathode 170, a screen grid 172 and a suppressor grid 174 connected to the cathode 170 grounded at 182 through the resister 160 is employed. A heater element 176 energized from the secondary winding 178 of the transformer 132' and grounded through a center tap 180 at 182 through resister 160, is used for heating the cathode 170.

The potential drop across a selected portion of the resistance 158 in the plate circuit is supplied to a meter and switching mechanism 190 schematically shown in Fig. 2. The selected portion of the potential drop across the resistance 158 which is proportionate to the current flowing through the plate circuit of the amplifying tube 164 is recorded on the chart 192 by an indicator 194 that moves to the right or to the left to indicate the current flowing through the plate circuit.

A motor unit 200 is used for actuating the indicator 194 and to open and close a pair of conacts or switches 202 and 204. As the motor unit does not form any part of the invention and as suitable units are now on the market, a detailed description thereof will not be made. A potentiometer such as is used for recording the flow of current from thermocouples has been found satisfactory as a motor unit for driving the parts in response to the potential drop across the variable resistance 158 in the plate circuit.

In the preferred embodiment the pressure of the steam supplied to the drying rolls is varied in response to variations in the moisture content of the paper as recorded by the meter 190. This has been accomplished by substituting for the knob 100 a motor 206 having its armature shaft connected to a clutch member 208 that cooperates with another clutch member 210 to drive the shaft 212, carrying a worm 214 cooperating with a worm gear 216 to oscillate the crank 218 to the right or left as seen in Fig. 2. The clutch 208-10 is caused to engage by pulling the knob 100 downwardly as viewed in Fig. 2, which also causes the gear 222 to disengage the bevel gear 224. A link 220 having one end connected to the crank 218 and the other end connected to the pivotally mounted jet 64 causes the jet 64 to move away or towards the flapper 60, thereby varying the steam pressure supplied to the drying rolls. As the switch 202 is closed, the motor 206 is energized so as to cause it to rotate in one direction thereby causing the crank on 218 to swing to the left, in Fig. 2. Likewise, as the switch 204 is closed, the motor is caused to rotate in the opposite direction thereby causing the crank arm 218 to swing in the opposite direction. The extended end of the crank 218 is arranged to engage safety switches 230 and 232 which interrupts the circuits closed by the switch 202 and 204 respectively. This is provided so as to stop the rotation of the motor 206 when it has actuated the jet 64 a sufficient distance to properly regulate the steam supplied to the drying rolls. Thus in the present construction a fluid pressure system utilizing air pressure supplied from an external source through the conduit 84 serves to automatically control the adjustment of the steam supply valve 82 under combined factors of temperature, moisture content and pressure, which exert a balanced control on the steam valve. The disturbance of any one of said factors causes an unbalanced condition to arise which effects a corresponding adjustment of the steam valve necessary to restore the normal balanced relation of temperature, moisture content and pressure. Any variation of either temperature or moisture content effects a corresponding opening or restriction of the jet nozzle 64 through which the air pressure system discharges to atmosphere, resulting in a corresponding fluctuation of back pressure which is transmitted to the pressure controlled steam valve 82.

In effecting such operation, the temperature responsive apparatus, including the bulb 46 and tubes 48 and 49 and pressure motor 50, act to adjust the flap 60 to and fro relative to the jet nozzle 64 proportionately to temperature change. At the same time, the moisture responsive instrument acting through the motor 206 and crank 218 actuate the link 220 to adjust the jet nozzle 64 to and fro relative to the flap proportionately to moisture change. Thus temperature and moisture content influences are opposed to each other in a balanced relation.

Air being supplied under pressure from an independent source through the pipe 84 to the nozzle 64, as the nozzle 64 and flap 60 approach by relative adjustment of either, the discharge from the nozzle is restricted and back pressure is increased in the air supply system. As the jet nozzle and flapper separate in response to either temperature change moving the flap 60 or moisture change moving the nozzle, one away from the other, the pressure in the air supply system decreases. The air supply pipe 84 is connected by a branch with the pressure control chamber 70 and thence through the tube 72 with the diaphragm chamber 76 which controls the steam supply valve 82. If intermediate means was not provided for equalizing or counteracting the action of the exhaust nozzle, the back pressure created in the air supply system as a result of the restriction of exhaust by approach of the nozzle and flap, would be exerted from the conduit 84 through the branch conduit to the chamber 70 and thence through the conduit 72 to effect a sudden and complete closure of the steam valve 82 by expansion of the diaphragm chamber 76. However, the increase of the back pressure in the conduit leading from the jet nozzle 64 to the sylphon 66 causes a proportionate movement of the valve 68 to restrict the air supply orifice 90 into the pressure chamber 70, thereby reducing the pressure of the air supply to the steam valve control chamber 76 and counteracting the sudden and violent back pressure effect of restricting the discharge through the nozzle 64.

Instead of controlling the steam supplied to the drying rolls, the control mechanism could be used to control other conditions of the paper making machinery, as for example, the caliper of the sheet, the temperature of the air passing over the drying rolls, the moisture content of the air, the rate of speed of rotation of the drying rolls or any other condition which would correct the moisture content of the paper.

In addition to indicating the moisture content of the paper as a whole, the movement of the contactor 108 to and fro across a sheet of paper indicates to the operator whether or not the moisture content of the strip is uniform throughout its width. If the moisture content is found to vary throughout the width of the paper, it indicates that probably the paper making machinery, aside from the drying rolls, is out of adjustment or is not functioning properly. The apparatus may then be corrected and the variations in the uniformity of the paper corrected.

As shown schematically in Fig. 2, the cable extending from the contactor 108 to the amplifier 164 passes over pulleys 240, 242, 246 and 248. In order to maintain the cable taut at all times, pulley 248 carries a weight 250 that keeps the cable in proper tension at all times and permits adjustment of the contactor 108 across a sheet of paper.

A flange 252 carried by the rail 116 cooperates therewith to form a channel 254 which guides the cable along the rail 116 and prevents the cable from coming in contact with the sheet 40. The cable is preferably completely insulated as for example, by rubber insulation, so as to keep all moisture therefrom. It has also been necessary to use precaution in properly insulating all the parts intermediate the resistance 158 and the resistance 162 for the reason that change of dampness of the medium surrounding the conductors carrying this minute current causes a change of the current which is improperly reflected into the meter 190 as a variation in the moisture content of the paper.

As the contactor 108 approaches the edge of the paper 40 it is necessary to raise the contactor therefrom, otherwise it would have a tendency to tear the edge of the paper. Referring to Fig. 3, this has been accomplished by a cam sector 260 adjustably carried on the rail 116 cooperating with an extension 262, shown in Fig. 4, extending from the frame 110.

In Figs. 10 to 12 a modification of the contactor has been disclosed. An arm 270 pivotally mounted on the chassis 114 is provided with a bifurcated end 272 and 274 having flexibly mounted thereon a plate 276 by a plurality of bolts 278 and influenced by helical springs 280. The springs 280 permit a flexing of the contactor 282 so that the contactor adjusts itself to the paper passing thereunder. The contactor 282 includes a frame 284 carried by the plate 276 by a plurality of bolts 286, an insulating member 288, another insulating member 290 carrying a plurality of contacts 292 and 294. The contacts 292 are connected to a buss bar or conductor 296 and the contacts 294 to another buss bar 298. The buss bars 296 and 298 are provided with each a prong 300 seated in sockets 302 connected to each a conductor connecting the electrodes to the amplifier. As the contacts 292 and 294 are subjected to wear due to the frictional engagement with the paper, the contactor 282 may be removed from the plate 276 by merely removing the nuts from the screws 286 and slipping the prongs 300 out of the sockets 302. A new contactor 282 may be substituted by inserting the prongs thereof into the sockets 302 and replacing the nuts carried by the bolts 286.

As best seen in Fig. 12, the contactor 282 is provided with a shoe 304 that assists in causing the contactor 282 to smoothly engage the paper.

In order that the readings obtained on the meter 190 may indicate the moisture content of the paper, it is necessary to properly adjust the amplifying device to accommodate changed conditions from time to time. In starting the apparatus, the manually operated voltage regulator 134 is adjusted to obtain the proper voltage reading across the volt meter 301, which is maintained constant by the automatic voltage regulator 135.

The tap on the resistance 160 is then adjusted so as to cause zero current to flow through the amplifying tube 164 at which time the reading on the meter 190 is zero. When this adjustment is made the contact circuit is opened either by a suitable switch 244 provided therefor or by removing the contactor 108 from the paper.

The contactor is then placed in contact with the sheet and the switch 244 closed which gives a reading on the meter 190 of some sort or another. This reading is checked against the moisture content of the paper coming into contact with the contactor as determined by an oven test. If the reading on the meter 190 is at variance with the measured moisture content of the paper, the tap 302 on the resistance 158 is moved to the right or to the left as viewed in Fig. 2 until the meter properly indicates the moisture content of the paper. It may be found that the meter 190 does not properly record variations in the moisture content. That is, the meter 190 has not been properly calibrated. This is taken care of by adjusting the tap 304 on the voltage divider 156 which does not materially influence the amplification factor of the amplifying tube 164 but does change the potential supplied across the contactor 108. If the readings on the meter 190 indicated a greater variation in moisture content than is actually the case, the potential across the contactor 108 is lowered until the readings are correct.

From the above it appears that the entire apparatus may be calibrated by changing the voltage 134 supplied to the in-put, by changing the grid bias, by changing the meter shunt and by changing the potential supplied to the contacts. These adjustments are merely illustrative of the possibilities of the device and any other equivalent adjustment may be used to accomplish the same result, as is well known to those skilled in the art.

Hydro-surface-conductivity gauge or measuring means or similar language as used in the claims, designates a device for measuring the moisture content of paper by the application of various potentials upon separate areas of the surface on one side only of the paper, whereby the percentage of moisture in the paper is measured independently of its thickness. In the modification disclosed herein the hydro-surface-conductivity gauge or measuring means includes the contactor 108 energized by a suitable potential amplified by the vacuum tube amplifying device as already described.

From the above description it will be apparent that there is thus provided a construction of the character described, possessing the particular features of advantage, before enumerated as desirable, but which obviously is susceptible of modification in its form, proportions, and arrangement of parts, without departing from the principle involved or sacrificing any of its advantages.

While in order to comply with the statute the invention is described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a device for controlling the moisture content of the material passing through a dryer, the combination including means for supplying heat to the dryer, thermal responsive means for controlling said heat supplying means, said thermal responsive means being adjustable for various temperatures, and hydro-surface-conductivity gauge means responsive to the moisture content of the material for adjusting the thermal responsive means to maintain the moisture content of the output material substantially uniform.

2. A device for controlling the moisture content of a sheet of material passing over drying rolls including means for supplying heat to said drying rolls, thermal responsive means for controlling the heat supplied to the said drying rolls, said thermal responsive means being adjustable and maintaining the temperature of the drying rolls substantially constant, hydro-surface-conductivity gauge means for adjusting said thermal responsive device in response to the moisture content of the sheet of material passing over the drying rolls, and manual means associated with said moisture responsive means for manually adjusting said thermal responsive means whereby the temperature of the drying rolls may be adjusted automatically in response to the moisture content of the material.

3. A moisture control mechanism for paper-making machines comprising a drying cylinder, the temperature of which is to be controlled, a source of heating medium for heating said cylinder, a control valve governing supply of heating medium to said cylinder, a pilot mechanism utilizing an independent source of pressure for operating said control valve and ordinarily exhausting to the atmosphere, an exhaust valve governing the exhaust from said mechanism, an instrument responsive to the moisture content of the paper, another instrument responsive to the temperature of said drying cylinder, and joint means operated by the action of said instruments for actuating said exhaust valve of the independent pressure system.

4. A moisture control mechanism for paper making machines comprising a drying cylinder, the temperature of which is to be controlled, a source of heating medium for heating said cylinder, a control valve governing a supply of heating medium to said cylinder, a control mechanism utilizing fluid under pressure from an independent source of pressure supply for operating said control valve and ordinarily exhausting to the atmosphere, an exhaust valve governing the exhaust from said control mechanism, an instrument responsive to the moisture content of the paper, another instrument responsive to the temperature of said drying cylinder, joint means operated by the action of said instruments for adjusting said exhaust valve of the independent pressure control means and means for counteracting the effect of said exhaust valve adjustment.

5. A moisture control mechanism for paper making machines comprising a drying cylinder, the temperature of which is to be controlled, a source of steam supply for heating said cylinder, a control valve governing supply of steam to said cylinder, a control means utilizing fluid under pressure from an independent source of pressure supply for operating said control valve and ordinarily exhausting to the atmosphere, an exhaust valve governing the exhaust from said control means, an instrument actuated by varying electroconductivity of the paper, another instrument responsive to the temperature of said drying cylinder, joint means operated by the action of said instruments for adjusting the exhaust valve of the independent pressure control means, and means responsive to the pressure thereof for counteracting the effect of said exhaust valve adjustment.

6. A moisture control mechanism for paper making machines comprising a drying cylinder, the temperature of which is to be controlled, a source of steam supply for heating said cylinder, a control valve governing supply of steam to said cylinder, a control means utilizing fluid under pressure from an independent source of pressure supply for operating said control valve and ordinarily exhausting to the atmosphere, an exhaust valve governing the exhaust from said control means, means for diverting said pressure to operate said control valve on the closing of said exhaust valve, an instrument actuated in accordance with varying moisture content of the paper, another instrument responsive to the temperature of said drying cylinder, joint means operated by the action of said instruments for adjusting the exhaust valve of the independent pressure control means, and means responsive to the pressure therein for counteracting the effect of said exhaust valve adjustment.

7. A moisture control mechanism for paper making machines comprising a drying cylinder, the temperature of which is to be controlled, a source of steam supply for heating said cylinder, a control valve governing supply of steam to said cylinder, a control means utilizing fluid under pressure from an independent pressure source for operating said control valve and ordinarily exhausting to the atmosphere, an exhaust valve governing the exhaust from said control means, a supply and waste valve in the control means, diaphragm mechanism acted on by said pressure and actuating said control valve to divert said pressure to the control valve for operating the said valve on closing of said exhaust valve, an instrument responsive to the moisture content of the paper, an instrument responsive to the temperature of said drying cylinder, joint means operated by the action of said instruments for adjusting said exhaust valve of the independent pressure control means, and means responsive to the pressure therein for counteracting the effect of said exhaust valve adjustment.

8. A moisture control system for paper making machines, comprising a drying cylinder, the temperature of which is to be controlled, a source of steam supply for heating said cylinder, a control valve governing the supply of steam to said cylinder, a control means utilizing fluid under pressure from an independent source of pressure for operating said control valve and ordinarily exhausting to the atmosphere, an exhaust nozzle discharging the exhaust from said control means, a movable flapper controlling the discharge from the exhaust nozzle, an instrument responsive to the temperature of the drying cylinder, means actuated by the temperature responsive instrument for changing the relation of the nozzle and the flapper, an instrument controlled by the variation of the moisture content of the paper, means actuated thereby for changing the relation of the flapper and exhaust nozzle independently of the action of said temperature responsive instrument, and a third element responsive to the pressure of the independent pressure control means for counteracting the relative adjustment of the flapper and exhaust nozzle as effected by either of said aforementioned means.

9. The method of controlling the operation of paper making machines which consists in regulating the supply of drying medium to a dryer roll by the varying influence of the electroconductivity of the moisture in the paper and simultaneously subjecting the regulation of the supply of dryer medium to the varying influence of the temperature of the dryer.

10. In a paper making machine including drying rolls and means for supplying steam to the interior of the rolls for drying purposes, dual control means for controlling the supply of steam to the rolls, including two opposing relatively adjustable members, one of which is responsive to fluctuations of the temperature of the rolls and the other of which is responsive to fluctuations of the moisture content of material passing over the rolls to be dried, the construction and arrangement being such that the differential movement of either of said members relative to the other will vary the steam supply independently of the other control means until a substantially balanced condition of moisture of the material and temperature of the rolls is maintained.

11. In a paper making machine including drying rolls and means for supplying steam to the interior of the rolls for drying purposes, dual control means for controlling the supply of steam to the rolls including a pair of adjustable cooperating elements adapted by their movement either toward and from the other to vary the steam supply to the rolls, one of said control elements being responsive to the temperature of the rolls and the other control element being responsive to the moisture content of material passing over the rolls to be dried, and means common to said relatively adjustable elements and responsive to their relative adjustment for varying the steam supply to maintain a substantially uniform relation of said temperature and moisture conditions.

12. In a paper making machine including drying rolls and means for supplying steam to the interior of the rolls for drying purposes, dual control means for controlling the supply of steam to the rolls, one of said control means being responsive to the temperature of the rolls and the other control means being responsive to the moisture content of material passing over the rolls to be dried, and fluid pressure means subject to said dual control means for maintaining the steam supply to the rolls consistent with aforesaid moisture and temperature conditions.

13. In a paper making machine including drying rolls and means for supplying steam to the interior of the rolls for drying purposes, a two-part differentially operative control means for controlling the supply of steam to the rolls, one of said control means being responsive to fluctuation of the temperature of the rolls and the other control means being responsive to fluctuations of the moisture content of material passing over the rolls to be dried, and associated valve operating means responsive to the differential relation of the respective temperature and moisture responsive means for maintaining a substantially balanced relation of said temperature and moisture conditions.

14. In a device for controlling the moisture content of a web, the combination with web drying rolls, a steam supply therefor, and valve means for regulating the supply of steam to the rolls, of control means for the valve responsive to the temperature of the roll, control means for the valve responsive to the degree of moisture in the web and fluid pressure operating means for the steam control valve responsive to differential influence of the temperature and moisture responsive means, the construction being such that the response of either control means independently of the other will effect a corresponding variation of the steam supply.

15. In a device for controlling the moisture content of a web, the combination with web drying rolls, a steam supply therefor, and valve means for regulating the supply of steam to the rolls, of control means for the valve responsive to the temperature of the roll, control means for the valve responsive to the degree of moisture in the web and fluid pressure operating means for the valve responsive to variations of the temperature or moisture control means each independently to the other.

16. In a device for controlling the moisture content of a web, the combination with web drying rolls, a steam supply therefor, fluid pressure operating means for regulating the supply of steam to the rolls, control means for the fluid pressure responsive to fluctuations of the temperature of the roll, control means for the fluid pressure responsive to fluctuations of the degree of moisture in the web, said temperature and moisture responsive control means being conjointly operative to vary the degree of fluid pressure influence upon the steam supply.

17. In a device for controlling the moisture content of a web, the combination with web drying rolls, a steam supply therefor, fluid pressure means for regulating the supply of steam to the rolls, fluid pressure control means responsive to fluctuations of the temperature of the roll, additional fluid pressure control means responsive to fluctuations of the degree of moisture in the web, the influence of said temperature and moisture responsive fluid pressure control means being opposed one to the other and the construction and arrangement being such that the valve regulating fluid pressure means is responsive only to the differential of the influences of the respective temperature and moisture responsive control means.

18. In a device for controlling the moisture content of a web, the combination with web drying rolls, a steam supply therefor, and fluid pressure means for regulating the supply of steam to the rolls, of fluid pressure control means responsive to fluctuations of the temperature of the roll, additional fluid pressure control means responsive to fluctuations of the degree of moisture in the web, the temperature responsive control means, the moisture responsive control means and the fluid pressure regulating means for the steam supply being normally maintained substantially in a state of equilibrium, the construction and arrangement being such that disturbance of such equilibrium by fluctuation of either temperature of the rolls or moisture content of the web independently of the other will effect a corresponding fluctuation of the steam regulatory fluid pressure until such equilibrium is restored.

19. In a device for controlling the moisture content of a web, the combination with web drying rolls, a steam supply therefor, and valve means for regulating the supply of steam to the rolls, of operating means for the valve responsive to the temperature of the roll, operating means for the valve including a hydro-surface-conductivity gauge responsive to the degree of moisture in the web.

20. In a device for controlling the moisture content of a web, the combination with web drying rolls, a steam supply therefor, and valve means for regulating the supply of steam to the rolls, of operating means for the valve responsive to the temperature of the roll, operating means for the valve including a hydro-surface-conductivity gauge responsive to the degree of moisture in the web, said gauge means being movably mounted with respect to the web to thereby contact selected areas of the web.

21. In a paper making machine including drying rolls and steam supply means for heating the rolls, a fluid pressure operated valve for controlling the admission of steam to the rolls, an air pressure system controlling the said fluid pressure operated valve, dual regulatory means operative in opposition one to the other for varying the air pressure in the valve control pressure system, including one regulatory means responsive to fluctuations of temperature of the rolls and another regulatory means responsive to fluctuations of the moisture content of the material passing over the rolls, either of which is operative independently of the other to increase or decrease the valve actuating pressure in the air pressure system and thereby vary admission of steam to the drying rolls.

22. The herein described method of automatically controlling the moisture content of a paper web while passing over drying rolls, including the steps of normally maintaining the temperature of the rolls, the moisture content of the paper web and fluid pressure regulatory means for a supply of heating medium to the rolls in a state of substantial equilibrium and utilizing fluctuations of the differential relation of the temperature and moisture factors to vary the regulatory fluid pressure until the state of equilibrium is again restored.

23. In a control system for controlling the moisture content of work material passing over a drying cylinder, the combination of a source of heating medium for heating a cylinder, a control device governing a supply of heating medium to said cylinder, a motive system utilizing an independent source of power for operating said control device, an element responsive to the moisture content of said work material, another element responsive to the temperature of said cylinder, and joint means controlled by said elements for governing said motive system, said joint means being acted upon by said moisture responsive element to reset the control point of said temperature responsive element to maintain the temperature of the said cylinder in accordance with said work material moisture requirements.

24. A moisture control mechanism for paper drying machines, comprising a drying cylinder, the moisture in a sheet passing which is to be controlled, a source of heating medium for heating said cylinder, a control device governing the supply of heating medium to said cylinder, a pilot mechanism utilizing an independent source of power for operating said control device, an element responsive to the moisture content of the paper, another element responsive to the temperature of the said cylinder, and joint means controlled by said elements for governing said pilot mechanism, said joint means being acted upon by said moisture responsive element to reset the control point of said temperature responsive element to maintain the temperature of said cylinder in accordance with said work material moisture requirements.

GEORGE HAROLD YOUNG.